US012632401B1

(12) United States Patent
Xu et al.

(10) Patent No.: US 12,632,401 B1
(45) Date of Patent: May 19, 2026

(54) DMA OPERATIONS USING DUAL TAIL POINTERS

(71) Applicant: Amazon Technologies, Inc., Seattle, WA (US)

(72) Inventors: Kun Xu, Austin, TX (US); Ron Diamant, San Jose, CA (US); Ilya Minkin, Los Altos, CA (US); Raymond S. Whiteside, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/465,382

(22) Filed: Sep. 12, 2023

(51) Int. Cl.
*G06F 13/28* (2006.01)

(52) U.S. Cl.
CPC .................................... *G06F 13/28* (2013.01)

(58) Field of Classification Search
None
See application file for complete search history.

(56) References Cited

U.S. PATENT DOCUMENTS

| | | | | |
|---|---|---|---|---|
| 6,789,172 | B2 * | 9/2004 | Chauvel | G06F 12/0835 |
| | | | | 710/22 |
| 7,555,577 | B2 * | 6/2009 | Castille | H04L 49/90 |
| | | | | 710/36 |
| 9,916,269 | B1 * | 3/2018 | Machulsky | G06F 13/4068 |
| 9,928,567 | B2 * | 3/2018 | Bittner | G06T 1/60 |
| 10,067,893 | B2 * | 9/2018 | Egi | G06F 13/4282 |
| 10,091,295 | B1 * | 10/2018 | Savic | G06F 16/25 |
| 10,241,947 | B2 * | 3/2019 | Edirisooriya | G06F 13/102 |
| 10,331,203 | B2 * | 6/2019 | Zwerg | G06F 3/0655 |
| 10,474,599 | B1 * | 11/2019 | Mohan | G06F 13/1673 |
| 10,664,282 | B1 * | 5/2020 | Minkin | G06F 9/52 |
| 10,860,511 | B1 * | 12/2020 | Thompson | G06F 13/28 |
| 11,232,058 | B2 * | 1/2022 | Jen | H04L 69/161 |
| 11,237,991 | B2 * | 2/2022 | Mody | H04N 5/77 |
| 11,698,869 | B1 * | 7/2023 | Kulkarni | G06F 12/1458 |
| | | | | 711/163 |
| 11,853,252 | B2 * | 12/2023 | Rennig | G06F 13/4072 |
| 12,164,402 | B1 * | 12/2024 | Xie | G06F 11/3055 |
| 12,204,757 | B1 * | 1/2025 | Xu | G06F 3/0611 |
| 12,253,950 | B2 * | 3/2025 | Luo | G06F 9/3877 |
| 12,321,396 | B1 * | 6/2025 | Sajja | G06F 16/901 |
| 2005/0091383 | A1 * | 4/2005 | Bender | H04L 67/1097 |
| | | | | 709/228 |
| 2009/0254572 | A1 * | 10/2009 | Redlich | G06Q 10/10 |
| 2015/0261718 | A1 * | 9/2015 | Campbell | G06F 13/4081 |
| | | | | 710/302 |
| 2018/0337863 | A1 * | 11/2018 | Roberts | H04L 12/4633 |

(Continued)

*Primary Examiner* — Henry Tsai
*Assistant Examiner* — Christopher A Bartels
(74) *Attorney, Agent, or Firm* — Weaver Austin Villeneuve & Sampson LLP

(57) ABSTRACT

A direct memory access (DMA) engine may receive a first indication that memory descriptors for a DMA operation are ready to be fetched from a memory. The DMA engine may prefetch the memory descriptors from the memory without waiting for memory locations specified in the memory descriptors to be ready for access. The DMA engine may receive a second indication that the memory locations specified in the memory descriptors are ready to be accessed. The DMA engine may execute the DMA operation based on the memory descriptors upon receiving the second indication.

20 Claims, 11 Drawing Sheets

(56)     References Cited

U.S. PATENT DOCUMENTS

| | | | |
|---|---|---|---|
| 2019/0286363 A1* | 9/2019 | Benisty | G06F 3/061 |
| 2021/0019600 A1* | 1/2021 | Huang | G06N 3/063 |
| 2021/0117360 A1* | 4/2021 | Kutch | G06F 3/0656 |
| 2021/0266185 A1* | 8/2021 | Konda | H04L 61/4511 |
| 2022/0075560 A1* | 3/2022 | Segev | G06F 3/0604 |
| 2022/0116408 A1* | 4/2022 | Healy | H04L 63/1425 |
| 2022/0121555 A1* | 4/2022 | Zbiciak | G06F 9/542 |
| 2022/0346058 A1* | 10/2022 | Alpert | H04W 4/80 |
| 2023/0231811 A1* | 7/2023 | Dalal | G06F 13/1605 |
| | | | 710/308 |
| 2024/0168801 A1* | 5/2024 | Segev | G06F 9/4881 |
| 2024/0272941 A1* | 8/2024 | Dragojevic | G06F 9/544 |

* cited by examiner

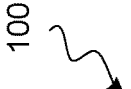
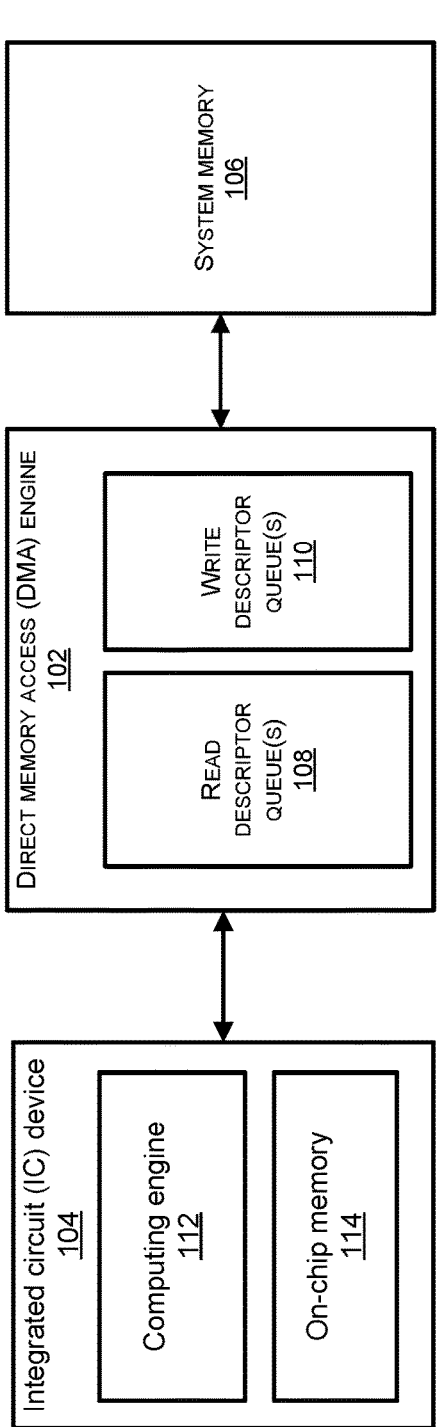
FIG. 1

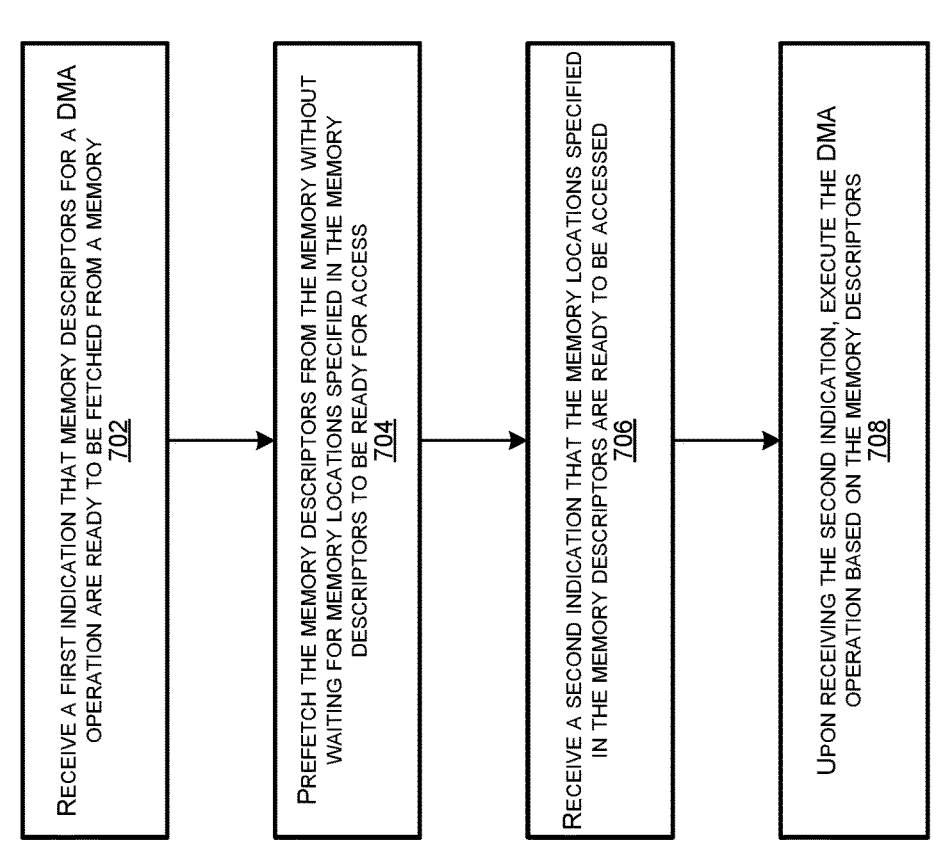

RECEIVE A FIRST INDICATION THAT MEMORY DESCRIPTORS FOR A DMA OPERATION ARE READY TO BE FETCHED FROM A MEMORY
702

PREFETCH THE MEMORY DESCRIPTORS FROM THE MEMORY WITHOUT WAITING FOR MEMORY LOCATIONS SPECIFIED IN THE MEMORY DESCRIPTORS TO BE READY FOR ACCESS
704

RECEIVE A SECOND INDICATION THAT THE MEMORY LOCATIONS SPECIFIED IN THE MEMORY DESCRIPTORS ARE READY TO BE ACCESSED
706

UPON RECEIVING THE SECOND INDICATION, EXECUTE THE DMA OPERATION BASED ON THE MEMORY DESCRIPTORS
708

FIG. 7

DMA OPERATIONS USING DUAL TAIL POINTERS

BACKGROUND

A direct memory access (DMA) engine is an integrated circuit (IC) device that includes circuitry to perform DMA operations in a host system. The DMA operations may include data transfers between different memory locations without involving the host processor to improve memory access latency and free up the host processor to perform other tasks. The DMA engine may perform the DMA operations by executing memory descriptors, which may include various attributes associated with the data transfer such as an address (e.g., source address for a read operation, target address for a write operation) and a data transfer size.

BRIEF DESCRIPTION OF THE DRAWINGS

Various embodiments in accordance with the present disclosure will be described with reference to the drawings, in which:

FIG. 1 illustrates an example of a computing system operable to perform data transfer operations between a system memory and an integrated circuit (IC) device using a direct memory access (DMA) engine;

FIG. 7 illustrates an example of a flow chart for a method executed by a DMA engine, according to some embodiments;

DETAILED DESCRIPTION

Figure 2:
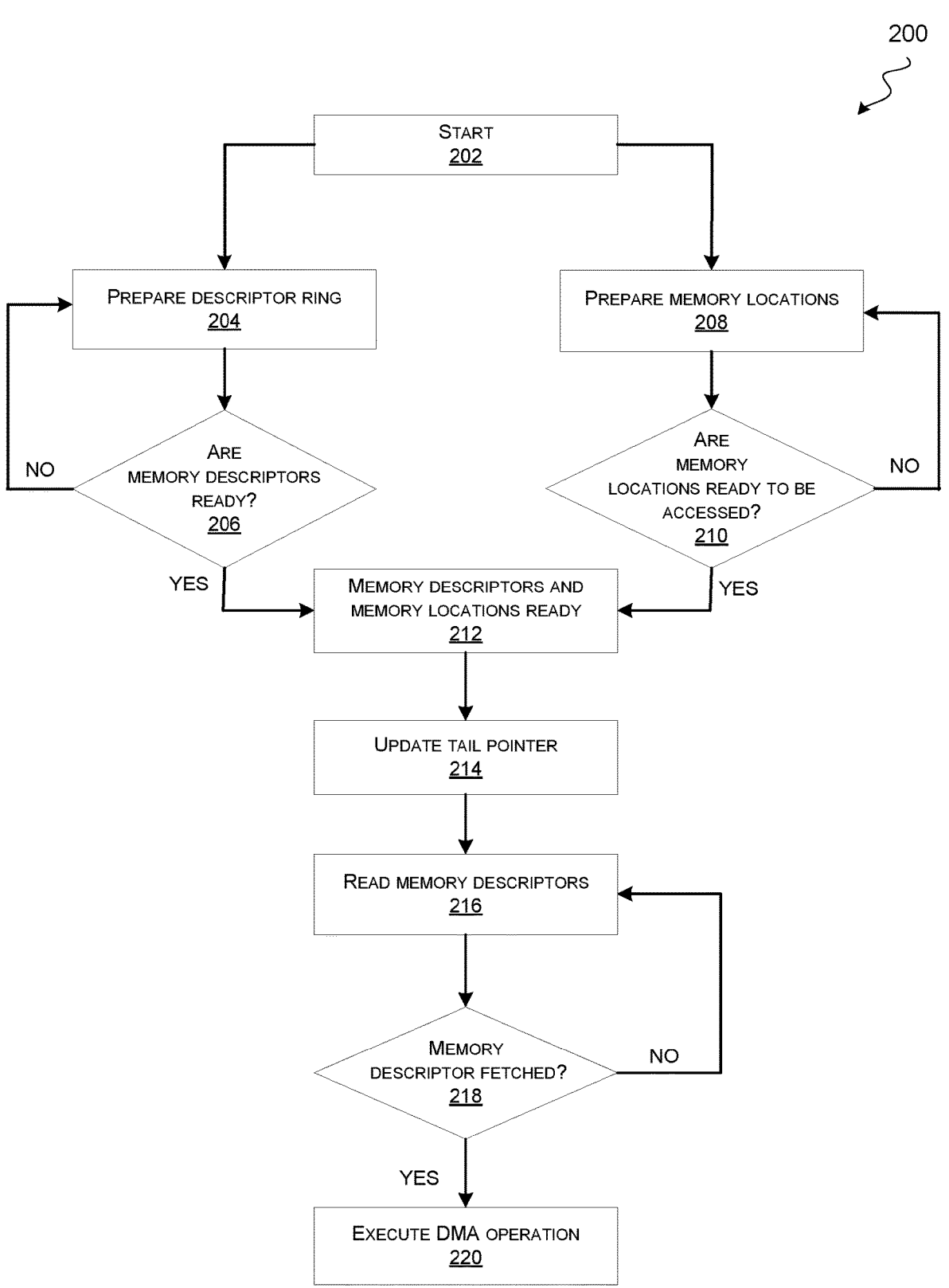
FIG. 2 illustrates a flow diagram of an example of a process for performing DMA operations using a single tail pointer.

In a computer system, direct memory access (DMA) engines are generally used to off-load data transfer operations from a host processor to improve system performance. In most implementations, the DMA engine may perform data transfers between different memory locations based on memory descriptors. The memory descriptors may include various attributes associated with the data transfer such as an address (e.g., a source address for a read operation, a target address for a write operation) and a data transfer size. In some implementations, when transferring a set of data from a source memory location to a target memory location, the DMA engine may read the set of data from the source memory location based on the read memory descriptors, temporarily store the set of data in a data buffer in the DMA engine, and then transfer the set of data from the data buffer to the target memory location based on the write memory descriptors.

The DMA engine may include one or more DMA queues. Each DMA queue may include a descriptor queue pair having a read descriptor queue to store the read memory descriptors for reading the data from the source memory locations, and a write descriptor queue to store the write memory descriptors for writing the data to the target memory locations. In some implementations, each descriptor queue may be implemented as a descriptor ring. A head pointer can be used to indicate the location of the next memory descriptor to process, and a tail pointer can be used to indicate the location of the last memory descriptor available in the descriptor queue. As memory descriptors are processed and new memory descriptors are added to the descriptor queue, the head and tail pointers can be updated accordingly. For example, when there are new memory descriptors available in the memory, the tail pointer can be incremented to indicate to the DMA engine to start fetching the new memory descriptors from the memory. As those memory descriptors are executed by the DMA engine, the head pointer can be incremented accordingly.

In some implementations, when a DMA read operation is to be performed, the read memory descriptors may be prepared by the software and stored in the memory. When the data for the DMA read operation is available in the memory (e.g., written by another system component), the tail pointer to the read descriptor queue may be incremented, which may instruct the DMA engine to fetch one or more read memory descriptors from the memory to perform the DMA read operation. Once the read memory descriptors have been fetched into the read descriptor queue, the DMA engine may read the data from the memory based on the read memory descriptors. In some examples, the DMA engine may temporarily store the data read from the memory into a read data buffer in the DMA engine before moving the data to the target memory location. Similarly, for a DMA write operation, the write memory descriptors can be stored in the memory, and the tail pointer to the write descriptor queue may be incremented when the target memory locations are available. This may instruct the DMA engine to fetch one or more write memory descriptors from the memory to perform the DMA write operation. Once the write memory descriptors have been fetched into the write descriptor queue, the DMA engine may write the data into the target memory locations based on the write memory descriptors. In some examples, the data to be written may be temporarily stored in a write data buffer in the DMA engine before it is transferred to the target memory locations.

For the implementations described above, incrementing the tail pointer will trigger two actions to be performed. First, the memory descriptors are fetched from the memory into the descriptor queue, and then the memory locations specified in the memory descriptors are accessed. These actions are not initiated until the tail pointer increments to indicate that both the memory descriptors and the memory locations are ready to be accessed. Thus, even when the memory descriptors are available, the DMA engine may not begin fetching the memory descriptors until after the memory locations specified in the memory descriptors are ready. This can lead to unnecessary startup latency, throughput gap, and long-lived memory allocation. This can be especially problematic for some memory devices that have high access latency (e.g., high bandwidth memory (HBM)), which can further complicate memory allocation and scheduling.

The techniques described herein can be used to minimize the DMA startup latency by removing the dependency on the memory locations to be ready for the data transfer before fetching the memory descriptors from the memory. Thus, the memory descriptors can be prefetched from the memory even before the memory locations specified in the memory descriptors are ready to be accessed, which can effectively reduce the DMA startup latency by half in most cases. A data tail pointer can be added in addition to an existing descriptor tail pointer for each descriptor queue to remove the dependency between reading the memory descriptors and accessing the memory locations specified in those memory descriptors. Having two separate tail pointers can allow the software to prefetch the memory descriptors before the memory locations are ready to be accessed to read or write the data for the DMA operation.

In some embodiments, the descriptor tail pointer to the descriptor queue can be incremented as soon as the memory descriptors are ready to be prefetched from the memory without waiting for the memory locations specified in the memory descriptors to be ready for access. In such cases, when the descriptor tail pointer is incremented, the memory descriptors can be prefetched from the memory into the descriptor queue while memory locations specified in the memory descriptors are still being prepared for access. For example, for the DMA read operations, the memory locations specified in the memory descriptors are ready to be accessed when the data to be read has been stored in the memory locations. The memory descriptors can be prefetched while the data is still being prepared in the memory locations (e.g., being written into the memory locations by a system component). For the DMA write operations, the memory locations specified in the memory descriptors are ready to be accessed when previously stored data at the memory locations are no longer needed. The memory descriptors can be prefetched while the consumer of the previously stored data is still reading the previous data from the memory locations. Thus, prefetching of the memory descriptors can be performed in parallel with the data preparation, which can reduce the DMA startup overhead and improve system performance.

When the memory locations specified in the memory descriptors are ready for access, the software can increment the data tail pointer, which can trigger execution of the memory descriptors that have already been prefetched into the descriptor queue in the DMA engine. For example, the DMA read operation can be executed when both the descriptor tail pointer and the data tail pointer to the read descriptor queue have been updated, and the DMA write operation can be executed when both the descriptor tail pointer and the data tail pointer to the write descriptor queue have been updated.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example of a computing system 100 operable to perform data transfer operations between a system memory 106 and an integrated circuit (IC) device 104 using a DMA engine 102.

The computing system 100 may include a direct memory access (DMA) engine 102 operable to perform data transfer operations between the IC device 104 and the system memory 106. The computing system 100 may include other components based on the functionalities supported by the system. For example, the computing system 100 may also include a host processor to execute software to configure and manage different components. In some implementations, different components of the computing system 100 may communicate with one another via one or more interconnects. In some cases, the computing system 100 can be used for machine learning applications to provide services including image recognition, natural language processing, video processing, or text-based queries, among other examples.

The IC device 104 may include a computing engine 112, and an on-chip memory 114. In some examples, the computing engine 112 may be configured to perform different computations on input data stored in the on-chip memory 114, and store the results of the computations back into the on-chip memory 114. As an example, the computing engine 112 may include a neural network processor, which may perform neural network computations on an input dataset (e.g., input feature maps) with weight values to generate an output dataset. For instance, the input dataset may include data associated with an image that needs to be classified, and the output dataset may include intermediate data associated with an intermediate layer of a neural network. The computing engine 112 may store the intermediate data in the on-chip memory 114 for subsequent computations to generate the final results. In some examples, the on-chip memory 114 can be used to store weight values and/or input feature maps for the execution of a neural network.

The system memory 106 may be operable to store sets of data associated with the IC device 104, and other suitable data. The system memory 106 can be implemented using DRAMs, SDRAMs, DDR SDRAMs, or another type of memory device. In some implementations, the system memory 106 can include high bandwidth memory (HBM), which may include vertically stacked DRAM chips. The on-chip memory 114 may include SRAM, or other type of suitable memories. The on-chip memory 114 may have a smaller capacity as compared to the system memory 106. In some cases, the on-chip memory 114 may be used as a cache to store the set of data associated with the computations performed by the computing engine 112.

The DMA engine 102 may include one or more read descriptor queues 108 and one or more write descriptor queues 110. The read descriptor queue 108 may store memory read descriptors for performing DMA read operations, and the write descriptor queue 110 may store memory write descriptors for performing DMA write operations. For example, the read descriptor queue 108 may store the memory read descriptors for reading the set of data from the on-chip memory 114, and the write descriptor queue 110 may store the memory write descriptors for writing the set of data read from the on-chip memory 114 to the system memory 106. In some implementations, the DMA engine 102 may temporarily transfer the set of data read from the on-chip memory 114 into a data buffer (not shown), and then from the data buffer to the system memory 106. The data buffer can be part of the DMA engine 102.

FIG. 2 illustrates a flow diagram of an example of a process 200 for performing DMA operations using a single tail pointer. For example, the DMA operations may be performed by the DMA engine 102 to transfer a set of data between the on-chip memory 114 and the system memory 106.

The process 200 may begin at block 202 to start the DMA operation. The DMA operation can be a DMA read operation or a DMA write operation.

At block 204, a descriptor ring may be prepared for the DMA operation. For example, software executing on the host processor may prepare the descriptor ring to store the memory descriptors in a memory (e.g., the on-chip memory 114 or the system memory 106) using a suitable data structure such as linked lists. Each memory descriptor can be programmed to include an address for the source memory location, an address for the target memory location, a data transfer size, and other suitable attributes.

At block 206, a determination can be made as to whether the memory descriptors are ready. If the memory descriptors are not ready, the software may continue preparing the descriptor ring by programming all the relevant memory descriptors to be stored in the memory for the DMA operation.

At block 208, the memory locations specific to the memory descriptors can be prepared for the DMA operation, while the descriptor ring is being prepared in the blocks 204 and 206. For example, for the DMA read operation, the data to be read can be stored in the memory locations. For the DMA write operation, the memory locations can be prepared by making sure that the previously stored data at those memory locations is no longer needed or has been read by a consumer of that data. In some examples, the memory locations may belong to a data buffer in the memory controller for the system memory 106 or the on-chip memory 114, which may temporarily store the data to be written for the DMA write operation.

At block 210, a determination may be made as to whether the memory locations are ready to be accessed. For example, the memory locations may not be ready to be accessed if the data to be read for the DMA read operation has not been written to the memory locations, or the memory locations are still being used by another consumer before it can be overwritten for the DMA write operation. As shown in FIG. 2, the blocks 204 and 206 can be executed in parallel with the blocks 208 and 210, e.g., the descriptor ring may be prepared while the memory locations specific to the memory descriptors are being prepared. For example, the block 202 that starts the DMA operation can trigger the blocks 204 and 208 to execute in parallel. However, preparations of the descriptor ring, and the memory locations specific to the memory descriptors can be performed in any order.

At block 212, the memory descriptors are ready, and the memory locations are ready to be accessed. Hence, at block 214, the tail pointer to the descriptor queue may be updated to indicate to the DMA engine that the memory descriptors are ready to be fetched from the memory and the memory locations are ready to be accessed. The tail pointer can be the tail pointer to the read descriptor queue for the DMA read operation, or the tail pointer to the write descriptor queue for the DMA write operation. In some implementations, a semaphore that acts as an event register can be updated to trigger the tail pointer to be updated to the descriptor queue.

At block 216, the DMA engine 102 may read the memory descriptors from the memory based upon the update of the tail pointer. For example, the DMA engine 102 may start fetching the read memory descriptors into the read descriptor queue, or the write memory descriptors into the write descriptor queue.

At block 218, a determination may be made as to whether the relevant memory descriptors have been fetched into the corresponding descriptor queue. The process 200 may continue reading the memory descriptors until all the relevant memory descriptors have been fetched.

At block 220, once the memory descriptors have been fetched into the descriptor queue, the DMA engine 102 may execute the DMA operation based on the memory descriptors. For example, the DMA engine 102 may read the data from the memory locations specified by the read memory descriptors for transferring to target memory locations, or the DMA engine 102 may write the data read from the source memory locations to the memory locations specified by the write memory descriptors.

Thus, as described with reference to the process 200, the tail pointer to trigger fetching of the memory descriptors from the memory is not incremented (in block 214) until the memory descriptors are ready in the memory (in block 206), and the memory locations are ready to be accessed (in block 210). This dependency can lead to startup latency for the DMA operations and result in throughput gap. This is further described with reference to FIG. 3.

Figure 3:
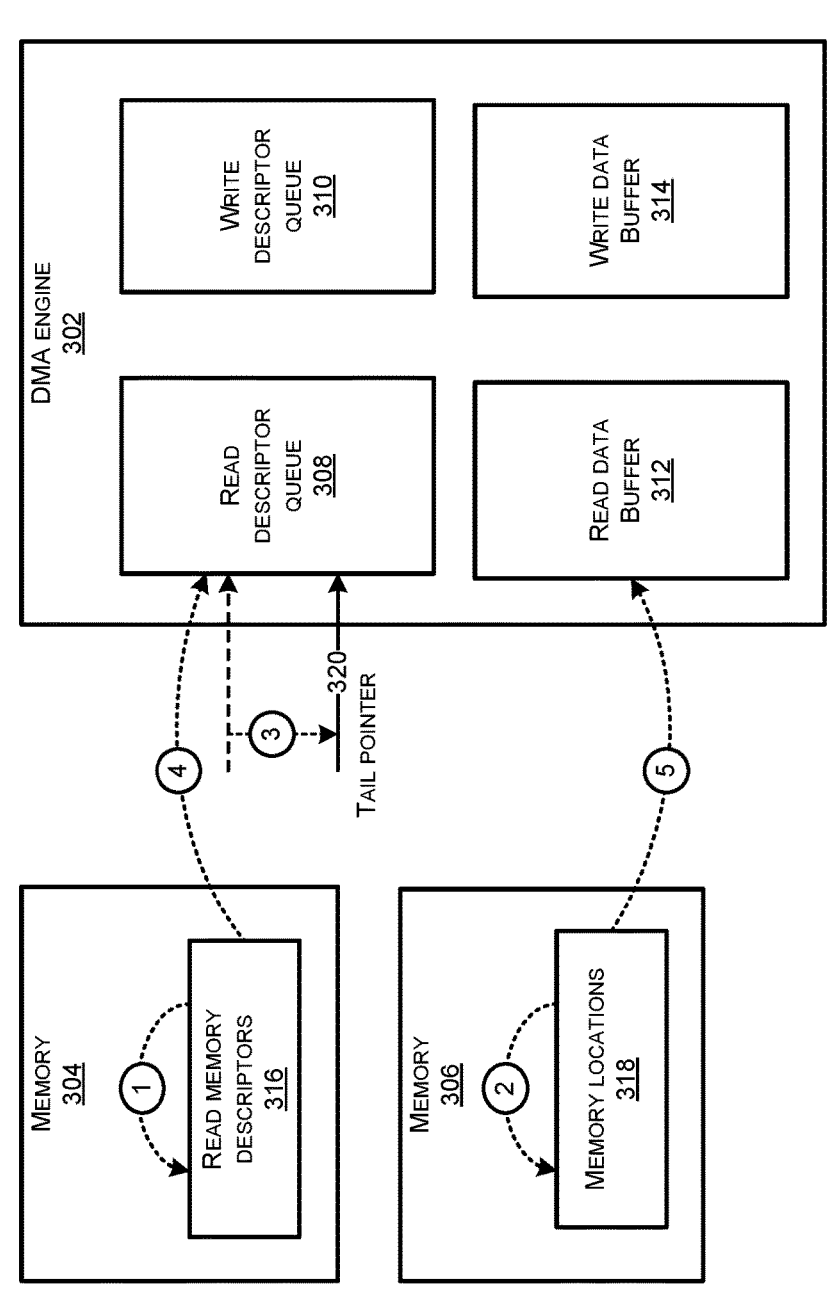
FIG. 3 illustrates steps for a DMA read operation using a single tail pointer.

FIG. 3 illustrates an example of steps for a DMA read operation 300 using a single tail pointer.

A DMA engine 302 may perform a DMA read operation to read data stored at memory locations 318 in a memory 306 based on read memory descriptors 316 stored in a memory 304. The DMA engine 302 can be an example of the DMA engine 102. The memory 304, and the memory 306 can be part of the same memory or different memories. For example, the memory 304 or the memory 306 may belong to the system memory 106 or the on-chip memory 114 in FIG. 1. The DMA engine 302 may include a read descriptor queue 308, a write descriptor queue 310, a read data buffer 312, and a write data buffer 314. The read descriptor queue 308 can be one of the queues in the read descriptor queues 108, and the write descriptor queue 310 can be one of the queues in the write descriptor queues 110.

In step 1, the software may prepare the read memory descriptors 316 in the descriptor ring in the memory 304, as described with reference to the blocks 204 and 206. In step 2, the memory locations 318 may be prepared to store the data to be read for the DMA read operation. For example, the memory 306 may belong to the on-chip memory 114, and the data to be read may be written by the computing engine 112 to be used for final computations. Steps 1 and 2 can be performed in parallel, as described with reference to the blocks 204/206 and blocks 208/210 in FIG. 2.

In step 3, once the read memory descriptors 316 are ready in the memory 304, and the data to be read by the DMA engine 302 are available in the memory locations 318, a tail pointer 320 to the read descriptor queue 308 may be updated to indicate to the DMA engine 302 to start fetching the read memory descriptors 316. In step 4, incrementing the tail pointer 320 may cause the DMA engine 302 to fetch the read memory descriptors 316 into the read descriptor queue 308. In step 5, once a read memory descriptor has been stored in the read descriptor queue 308, the DMA engine 302 may start executing the read memory descriptor from the read descriptor queue 308 by reading the data from the memory location specified in the memory descriptor into the read data buffer 312 for transferring to the target memory locations.

Thus, as described above, the tail pointer is not incremented to trigger the DMA operation until both the memory descriptors and the memory locations are ready, which can lead to start-up latency in the DMA operations. For example, updating of the tail pointer 320 is dependent on the completion of both the steps 1 and 2, which can delay execution of the steps 4 and 5. Similarly, for the DMA write operations, the tail pointer is not incremented until the write memory descriptors are ready in the memory 304 and the memory locations 318 are available to store the data.

Techniques described herein can be used to reduce the start-up latency for the DMA operations by using dual tail pointers to the descriptor queue. For example, a descriptor tail pointer can be used to indicate when the memory descriptors are ready to be fetched, and a data tail pointer can be used to indicate when the memory locations specific to the memory descriptors are ready to be accessed for reading or writing the data. Having separate tail pointers to indicate the readiness of the memory descriptors and the memory locations can allow the DMA engine to prefetch the memory descriptors from the memory while the memory locations are being prepared to be accessed. Thus, the dependency of fetching the memory descriptors on waiting for the memory locations to be ready can be removed, which can reduce the start-up latency and improve system performance. This is further described with reference to FIG. 4.

Figure 4:
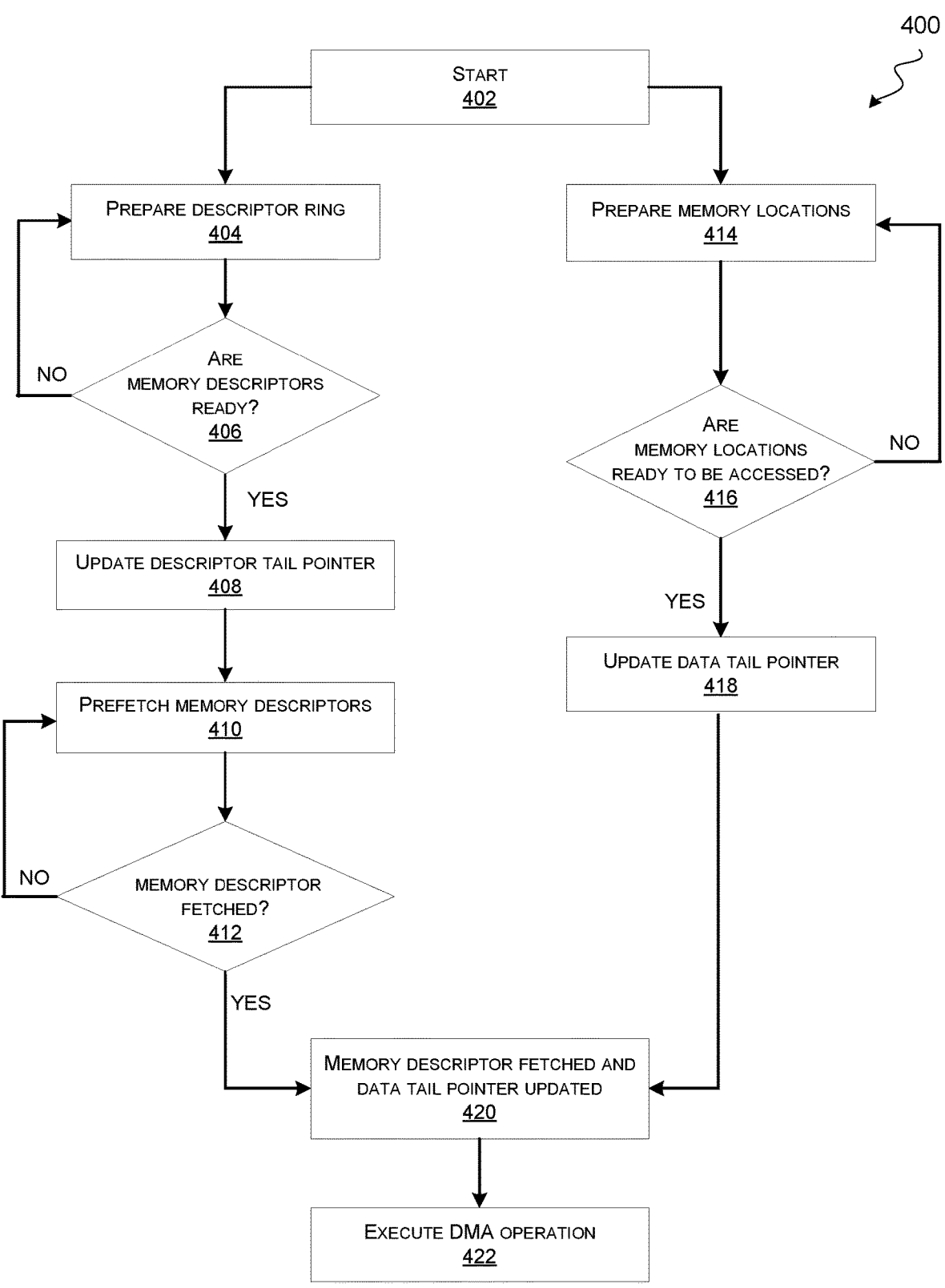
FIG. 4 illustrates a flow diagram of an example of a process for performing DMA operations using dual tail pointers, according to some embodiments.

FIG. 4 illustrates a flow diagram of an example of a process 400 for performing DMA operations using dual tail pointers, according to some embodiments. For example, the DMA operations may be performed by the DMA engine 102 to transfer a set of data between the on-chip memory 114 and the system memory 106.

The process 400 may begin at block 402 to start the DMA operation. The DMA operation can be a DMA read operation or a DMA write operation.

At block 404, a descriptor ring can be prepared for the DMA operation as described with reference to the block 204 in FIG. 2.

At block 406, a determination can be made as to whether the memory descriptors are ready. If the memory descriptors are not ready, software may continue preparing the descriptor ring by programming all the relevant memory descriptors to be stored in the memory for the DMA operation. For example, the memory that stores the memory descriptors can be part of the on-chip memory 114, the system memory 106, or another memory associated with the computing system 100.

At block 408, when the memory descriptors are ready in the memory, a descriptor tail pointer to a descriptor queue in the DMA engine may be updated. The descriptor tail pointer can be the tail pointer to the read descriptor queue for the DMA read operation indicating that the read memory descriptors are ready, or the tail pointer to the write descriptor queue for the DMA write operation indicating that the write memory descriptors are ready.

At block 410, the DMA engine 102 may prefetch the memory descriptors from the memory based upon the update of the descriptor tail pointer without waiting for the memory locations to be ready for access. For example, the DMA engine 102 may start fetching the read memory descriptors into the read descriptor queue for the DMA read operation, or the write memory descriptors into the write descriptor queue for the DMA write operation.

At block 412, a determination may be made as to whether a memory descriptor has been fetched into the corresponding descriptor queue. The process 400 may continue reading the memory descriptors from the memory until all the relevant memory descriptors have been fetched.

At block 414, while the memory descriptors are being prepared in the memory, or being prefetched from the memory, the memory locations specific to those memory descriptors can be prepared for the DMA operation. For example, for the DMA read operation, the memory locations can be prepared by storing the data to be read in the memory locations. For the DMA write operation, the memory locations can be prepared by waiting until the previously stored data at the memory locations is no longer needed or has been read by a consumer of that data. Note that block 414 can be executed in parallel with any of the blocks 404, 406, 408, or 410 to reduce the start-up latency. In some examples, the block 402 that starts the DMA operation can trigger the blocks 404 and 414 to execute in parallel. However, preparations of the descriptor ring and the memory locations specific to the memory descriptors can be performed in any order.

At block 416, a determination may be made as to whether the memory locations are ready to be accessed. For example, the memory locations may not be ready to be accessed if the data to be read for the DMA read operation has not been written to the memory locations, or the memory locations for the DMA write operation are still being used by another component.

At block 418, a data tail pointer to the descriptor queue in the DMA engine may be updated to indicate to the DMA engine that the memory locations specific to the memory descriptors are ready to be accessed. The data tail pointer can be a read data tail pointer to the read descriptor queue for the DMA read operation indicating that the data at the memory locations is ready to be read, or a write data tail pointer to the write descriptor queue for the DMA write operation indicating that the memory locations are available or ready to be written with the data for the DMA write operation.

At block 420, the DMA engine 102 has a memory descriptor in the descriptor queue to execute, and the data tail pointer has been updated. Hence, at block 422, once a memory descriptor is available in the descriptor queue, and the data tail pointer is updated, the DMA engine 102 can execute the DMA operation based on the memory descriptor. For example, the DMA engine 102 may read the data from the memory location specified by the read memory descriptor for transferring to the target memory location, or the DMA engine 102 may write the data read from the source memory location to the memory location specified by the write memory descriptor. The DMA engine 102 may continue to execute the memory descriptors available in the descriptor queue until the descriptor tail pointer is reached. Thus, the use of separate tail pointers to indicate the readiness of the memory descriptors and the memory locations can allow executing block 414 in parallel with block 410, which can accelerate the start-up time for the DMA operation as compared to using the single tail pointer described with reference to FIG. 2 and FIG. 3.

Figure 5A:
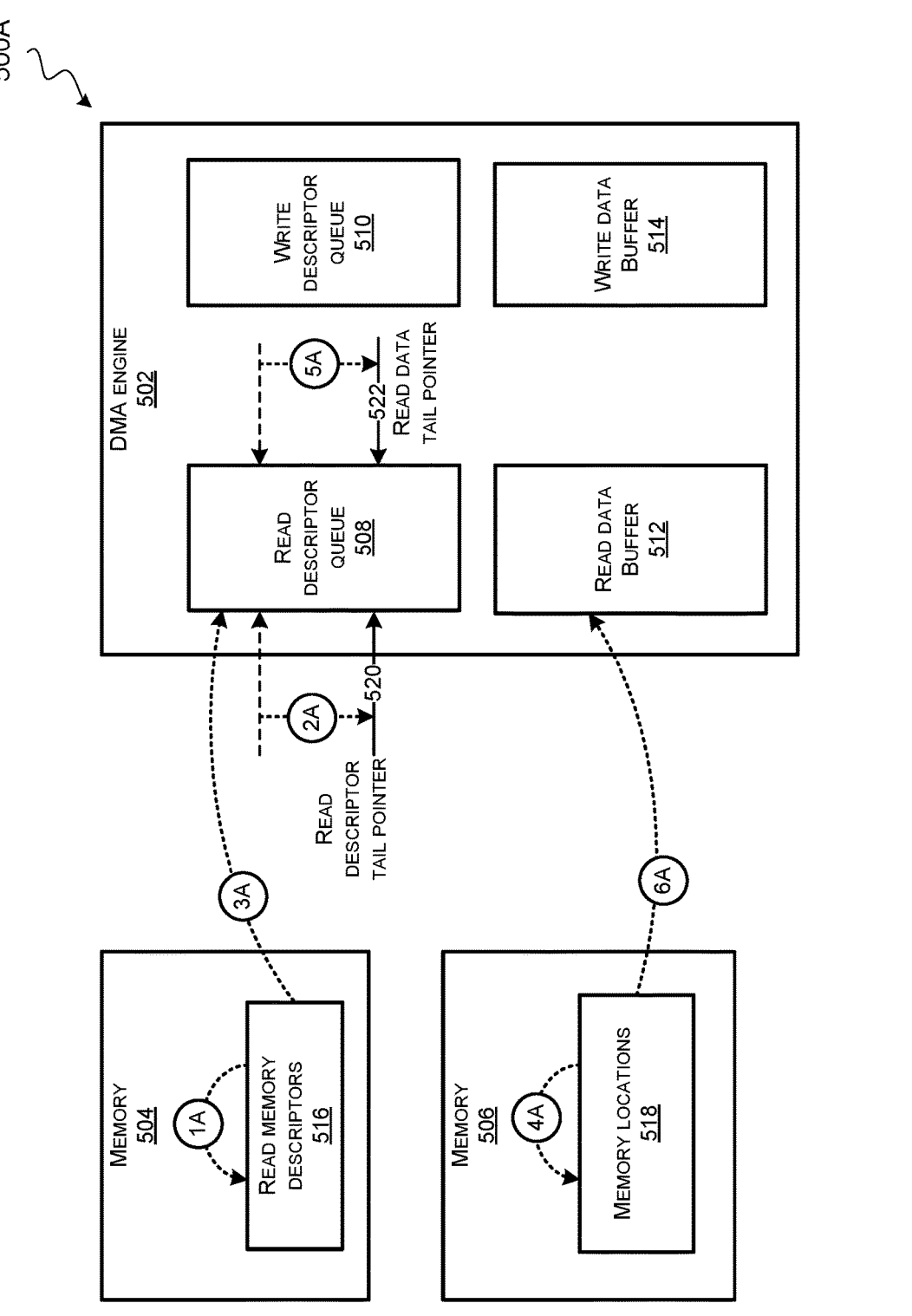
FIG. 5A illustrates an example of steps for a DMA read operation using dual tail pointers, according to some embodiments.

FIG. 5A illustrates steps for a DMA read operation 500A using dual tail pointers, according to some embodiments.

A DMA engine 502 may be operable to perform a DMA read operation to read data stored at memory locations 518 in a memory 506 based on read memory descriptors 516 stored in a memory 504. The DMA engine 502 can be an example of the DMA engine 102. The memory 504, and the memory 506 can be part of the same memory or different memories. For example, the memory 504 or the memory 506 may belong to the system memory 106 or the on-chip memory 114 in FIG. 1. The DMA engine 502 may include a read descriptor queue 508, a write descriptor queue 510, a read data buffer 512, and a write data buffer 514. The read descriptor queue 508 can be one of the queues in the read descriptor queues 108, and the write descriptor queue 510 can be one of the queues in the write descriptor queues 110.

In step 1A, the software may prepare the read memory descriptors 516 in the descriptor ring in the memory 504, as described with reference to the blocks 404 and 406. When the read memory descriptors 516 are ready in the memory 504, a read descriptor tail pointer 520 to the read descriptor queue 508 can be updated, as shown by step 2A. Updating the read descriptor tail pointer 520 to the read descriptor queue 508 may cause the DMA engine 502 to start prefetching the read memory descriptors 516 into the read descriptor queue 508 without waiting for the memory locations 518 to be ready with the data to be read, as shown by step 3A.

In step 4A, the memory locations 518 in the memory 506 may be prepared to be accessed to store the data to be read for the DMA read operation. For example, the data to be read may be written by another component of the computing system 100, e.g., the computing engine 112. As described with reference to block 414 being executed in parallel with block 410, the steps 3A and 4A can be executed in parallel by prefetching the read memory descriptors 516 into the read descriptor queue 508 while the memory locations 518 are being ready for access. In some examples, the step 4A can be performed in parallel with the steps 1A and 2A.

In step 5A, a read data tail pointer 522 to the read descriptor queue 508 may be updated to indicate to the DMA engine 502 that the memory locations 518 are ready to be accessed, e.g., the data to be read has been stored in the memory locations 518. In step 6A, upon determining that the read data tail pointer 522 has been updated, and the read memory descriptors 516 have been stored in the read descriptor queue 508, the DMA engine 502 may start executing the read memory descriptors 516 for the DMA read operation by reading the data from the memory locations 518 into the read data buffer 512 for transferring to the target memory locations.

Figure 5B:
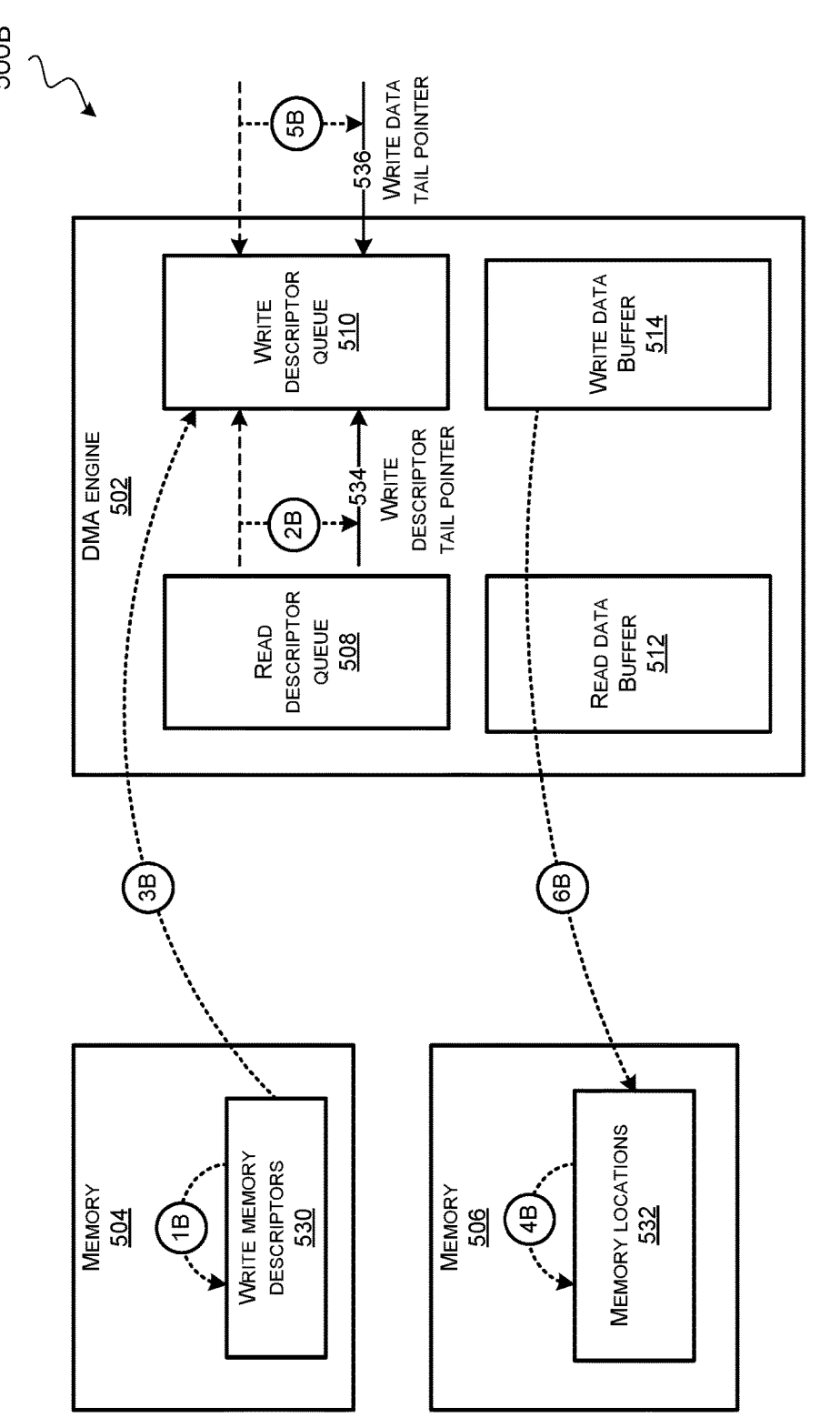
FIG. 5B illustrates an example of steps for a DMA write operation using dual tail pointers, according to some embodiments.

FIG. 5B illustrates steps for a DMA write operation 500B using dual tail pointers, according to some embodiments.

The DMA write operation 500B can be performed by the DMA engine 502 of FIG. 5A. The DMA engine 502 may be operable to perform a DMA write operation to write data at memory locations 532 in the memory 506 based on write memory descriptors 530 stored in the memory 504. The data to be written for the DMA write operation may be temporarily stored in the write data buffer 514. For example, the DMA engine 502 may have performed a read operation to transfer the data from another memory location into the write data buffer 514.

In step 1B, software may prepare the write memory descriptors 530 in the descriptor ring in the memory 504, as described with reference to the blocks 404 and 406. When the write memory descriptors 530 are ready in the memory 504, a write descriptor tail pointer 534 to the write descriptor queue 510 can be updated, as shown in step 2B. Updating the write descriptor tail pointer 534 to the write descriptor queue 510 may cause the DMA engine 502 to start prefetching the write memory descriptors 530 into the write descriptor queue 510 without waiting for the memory locations 532 to be ready to be accessed, as shown in step 3B.

In step 4B, the memory locations 532 in the memory 506 may be prepared to be accessed to write the data for the DMA write operation. As described with reference to the block 414 being executed in parallel with block 410, the steps 3B and 4B can be executed in parallel to prepare the memory locations 532 to be ready to be accessed in parallel with prefetching the write memory descriptors 530 into the write descriptor queue 510. For example, the previously stored data at the memory locations 532 can still be read by another component of the computing system 100 while the DMA engine 502 is prefetching the write memory descriptors 530 into the write descriptor queue 510. In some examples, the step 4B can be performed in parallel with the steps 1B and 2B.

In step 5B, a write data tail pointer 536 to the write descriptor queue 510 may be updated to indicate to the DMA engine 502 that the memory locations 532 are ready to be accessed, e.g., the previously stored data in the memory locations 532 are no longer needed by the consumer of that data, thus, the memory locations 532 can be overwritten with the new data for the DMA write operation. In step 6B, upon determining that the write data tail pointer 536 has been updated, and the write memory descriptors 530 have been stored in the write descriptor queue 510, the DMA engine 302 may start executing the write memory descriptors 530 for the DMA write operation by writing the data from the write data buffer 514 into the memory locations 532.

Figure 6:
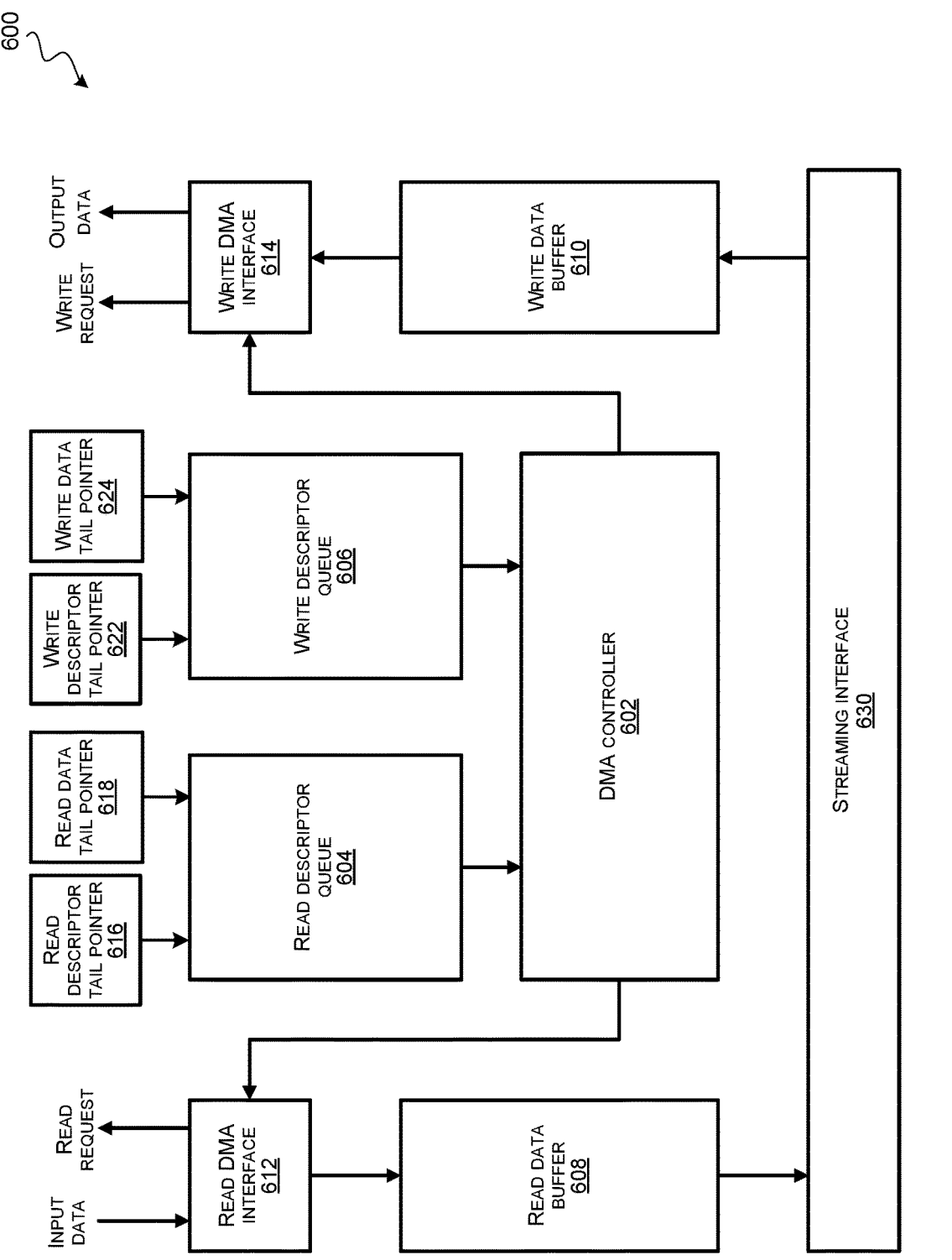
FIG. 6 illustrates a more detailed block diagram of an example of a DMA engine in accordance with some embodiments.

FIG. 6 illustrates a more detailed block diagram of an example of a DMA engine 600 in accordance with some embodiments. The DMA engine 600 can be an example implementation of the DMA engine 102, or the DMA engine 502.

The DMA engine 600 may include a read datapath and a write datapath coupled to a streaming interface 630. The read datapath may include a read DMA interface 612 and a read data buffer 608. Operation of the read datapath may be controlled by read memory descriptors stored in a read descriptor queue 604. The write datapath may include a write DMA interface 614 and a write data buffer 610. Operation of the write datapath may be controlled by write memory descriptors stored in a write descriptor queue 606. The DMA engine 600 may also include a DMA controller 602 coupled to the read DMA interface 612, write DMA interface 614, read descriptor queue 604 and the write descriptor queue 606. Data read by the read datapath can be streamed to the write data path via the streaming interface 630. The memory read descriptors can be paired with memory write descriptors to perform a data transfer that reads data from one location and writes the data being read to another location. The read data path and the write data path can also operate independently from each other. In some implementations, the streaming interface 630 can be coupled to other components of a computing system to allow other components to obtain data from the streaming interface 630 or to provide data to the streaming interface 630.

The read descriptor queue 604 may be a descriptor buffer/FIFO that stores the memory read descriptors being processed by the DMA engine 600. In some implementations, the read descriptor queue 604 can be implemented as a ring queue. A head pointer (not shown in FIG. 6) can be used to indicate the location of the next read memory descriptor to process. A read descriptor tail pointer 616 can be used to indicate the location of the last read memory descriptor available in the read descriptor queue 604. The read descriptor tail pointer 616 may be updated when there are new read memory descriptors available to be fetched. For example, the read descriptor tail pointer 616 can be an example of the read descriptor tail pointer 520 in FIG. 5A, which is updated when the read memory descriptors 516 are ready to be fetched from the memory 504, as described with reference to step 2A. The DMA controller 602 may be configured to determine that the read memory descriptors 516 are stored in the memory 504 based on an update of the read descriptor tail pointer 616.

A read data tail pointer 618 can be used to trigger the DMA engine 600 to execute the DMA read operation based on the read memory descriptors stored in the read descriptor queue 604. The read data tail pointer 618 can be updated when the data to be read at the memory locations specified in the read memory descriptors for the DMA read operation is ready to be read. In some implementations, the read data tail pointer 618 is an example of the read data tail pointer 522, which is updated when the data for the DMA operation has been stored at the memory locations 518, and the memory locations 518 are ready to be accessed based on the read memory descriptors 516. The DMA controller 602 may be further configured to determine that the data to be read at the memory locations 518 is ready based on an update of the read data tail pointer 618. The DMA controller 602 may be further configured to perform the DMA read operation by reading the data from the memory locations specified in the read memory descriptors into the read data buffer 608 in response to both the read descriptor tail pointer 616 and the read data tail pointer 618 being updated.

Similarly, the write descriptor queue 606 may be a descriptor buffer/FIFO that stores the memory write descriptors being processed by the DMA engine 600. A write descriptor tail pointer 622 can be used to indicate the location of the last write memory descriptor available in the write descriptor queue 606. The write descriptor tail pointer 622 may be updated when there are new write memory descriptors available to be fetched. For example, the write descriptor tail pointer 622 can be an example of the write descriptor tail pointer 534 in FIG. 5B, which is updated when the write memory descriptors 530 are ready to be fetched from the memory 504, as described with reference to step 2B. The DMA controller 602 may be further configured to determine that the write memory descriptors 530 are stored in the memory 504 based on an update of the write descriptor tail pointer 622.

A write data tail pointer 624 can be used to trigger the DMA engine 600 to execute the DMA write operation based on the write memory descriptors stored in the write descriptor queue 606. The write data tail pointer 624 can be updated when the memory locations specified in the write memory descriptors are available to store the data for the DMA write operation. The DMA controller 602 may be further configured to determine that the memory locations 532 are available to store the data for the DMA write operation based on the update of the write data tail pointer 624. In some implementations, the write data tail pointer 624 is an example of the write data tail pointer 536, which is updated when the previously stored data at the memory locations 532 are no longer needed, and the memory locations 532 are ready to be accessed based on the write memory descriptors 530. The DMA controller 602 may be further configured to perform the DMA write operation by writing the data from the write data buffer 610 into the memory locations specified in the write memory descriptors in response to both the write descriptor tail pointer 622 and the write data tail pointer 624 being updated.

The read descriptor tail pointer 616, the read data tail pointer 618, the write descriptor tail pointer 622, and the write data tail pointer 624 can be updated by software using a suitable interface. In some implementations, a corresponding semaphore/event register can be updated when the memory descriptors are stored in the memory, and/or the memory buffer is available for the data transfer, and the corresponding tail pointer can be updated based on the semaphore update. However, other implementations are also possible. It should be noted that the DMA engine 600 may include multiple read and write descriptor queue pairs, and each set of read and write descriptor queue pair may have its own corresponding descriptor tail pointers and data tail pointers.

The DMA controller 602 may also be configured to process read memory descriptors retrieved from the read descriptor queue 604, or write memory descriptors retrieved from the write descriptor queue 606. For example, the DMA controller 602 may retrieve a read memory descriptor from the read descriptor queue 604, and provide the read memory descriptor to the read DMA interface 612 to perform the requested data transfer using the source address in the read memory descriptor. Similarly, the DMA controller 602 may retrieve a write memory descriptor from the write descriptor queue 606, and provide the write memory descriptor to the write DMA interface 614 to perform the requested data transfer using the target address in the write memory descriptor.

The read DMA interface 612 may be operable to perform data transfers based on the read memory descriptors provided by the DMA controller 602. For example, a read memory descriptor provided by the DMA controller 602 may include a data length, and an address indicating the location of the data to read. The read DMA interface 612 may send a read request to the component of the computing system mapped to the address indicated in the read memory descriptor to obtain the data length amount of data from that address. The data obtained from the address via an input data interface may be written into read data buffer 608. The streaming interface 630 may stream the data stored in the read data buffer 608 to the write data buffer 610 to transfer the data to the intended target location.

The write data buffer 610 and the write DMA interface 614 may operate in a similar manner as their read counterparts, with the exception that instead of obtaining the data from the components of a computing system, the write DMA interface 614 may be used for transferring the data from the write data buffer 610 to the components of the computing system. For example, in response to a write memory descriptor provided by the DMA controller 602 from the write descriptor queue 606, the write DMA interface 614 may obtain the data from the write data buffer 610 provided by the streaming interface 630, and send a write request to a component of the computing system to transfer the data via an output data interface. The amount of data being obtained from the write data buffer 610 and written to the target location can be indicated by a data length provided in the write memory descriptor, and the write DMA interface 614 may write that data to the address provided in the write memory descriptor.

FIG. 7 illustrates an example of a flow chart 700 for a method executed by a DMA engine, according to some embodiments. The DMA engine can be an example of the DMA engine 102, the DMA engine 502, or the DMA engine 600.

In step 702, the method may include receiving a first indication that memory descriptors for a DMA operation are ready to be fetched from a memory. In some examples, the DMA operation can be a DMA read operation, and the first indication may include updating of the read descriptor tail pointer 520 to the read descriptor queue 508 when the read memory descriptors 516 are ready to be fetched from the memory 504. In some examples, the DMA engine may be used to transfer data from the on-chip memory 114 to the system memory 106, or vice versa as described in FIG. 1, or between other memory locations in the system. For example, the memory 506 may be part of the on-chip memory 114. The software executing on the computing engine 112 may prepare the descriptor ring by programming the read memory descriptors 516 with the corresponding source address, target address, data transfer length, and any other attributes, and increment the read descriptor tail pointer 520 when the read memory descriptors 516 are ready to be fetched.

In step 704, the method may further include prefetching the memory descriptors from the memory without waiting for memory locations specified in the memory descriptors to be ready for access. The DMA controller 602 may determine that the read descriptor tail pointer 616 has been incremented, and prefetch the read memory descriptors 516 into the read descriptor queue 604 without waiting for the memory locations 518 to be ready with the data to be read. As described with reference to the steps 3A and 4A in FIG. 5A, while the DMA controller 602 is prefetching the read memory descriptors 516 into the read descriptor queue 604, the data to be read is being written into the memory locations 518.

In step 706, the method includes receiving a second indication that the memory locations specified in the memory descriptors are ready to be accessed. The second indication may include updating of a data tail pointer to the read descriptor queue, and the memory locations specified in the memory descriptors are ready to be accessed when the data to be read has been stored in the memory locations. For example, when the data to be read has been stored in the memory locations 518, the software executing on the computing engine 112 may increment the read data tail pointer 522 to indicate to the DMA controller 602 that the memory locations 518 are ready to be accessed. In some implementations, the data to be read by the DMA controller 102 is written to the memory 506 by the computing engine 112. For example, the computing engine 112 may increment a semaphore after writing the data into the on-chip memory 114, which can be detected by the software executing on the computing engine 112 to determine that the memory locations 518 have the data to be read for the DMA read operation, and increment the read data tail pointer 522.

In step 708, the method includes upon receiving the second indication, executing the DMA operation based on the memory descriptors. The DMA controller 602 may execute the DMA read operation when both the read descriptor tail pointer 616 and the read data tail pointer 618 to the read descriptor queue 604 have been updated. For example, the DMA controller 602 may retrieve a read memory descriptor from the read descriptor queue 604, and provide the read memory descriptor to the read DMA interface 612 to read the data from the on-chip memory 114 using the source address in the read memory descriptor. The read DMA interface 612 may send a read request to obtain the data length amount of data from the on-chip memory 114. The data obtained from the on-chip memory 114 via the input data interface may be written into read data buffer 608. The streaming interface 630 may stream the data stored in the read data buffer 608 to the write data buffer 610 to transfer the data to the intended target location in the system memory 106.

In some examples, the DMA operation can be a DMA write operation to transfer data from the system memory 106 to the on-chip memory 114. In this example, the first indication may include incrementing the write descriptor tail pointer 534 to the write descriptor queue 510 when the write memory descriptors 530 are ready to be fetched from the memory 504. The DMA controller 602 may determine that the write descriptor tail pointer 622 has been incremented, and prefetch the write memory descriptors 530 into the write descriptor queue 510 without waiting for the memory locations 532 to be ready to store the data for the DMA write operation. As described with reference to the steps 3B and 4B in FIG. 5B, while the DMA controller 602 is prefetching the write memory descriptors 530 into the write descriptor queue 510, the previously stored data at the memory locations 532 is being read by the computing engine 112.

When the previously data stored at the memory locations 532 are no longer needed, the software executing on the computing engine 112 may increment the write data tail pointer 536 to the write descriptor queue 510, which may trigger the DMA controller 602 to execute the DMA write operation since both the write descriptor tail pointer 622 and the write data tail pointer 624 to the write descriptor queue 606 have been updated. The DMA controller 602 may transfer the data stored in the write data buffer 610 to the on-chip memory 114 using the write DMA interface 614, as described previously.

The techniques described herein rely on using dual tail pointers to remove dependency on the memory locations to be ready for the data transfer before fetching the memory descriptors from the memory. Thus, the memory descriptors can be prefetched from the memory even before the memory locations specified in the memory descriptors are ready to be accessed, which can effectively reduce the DMA startup latency by half.

Figure 8:
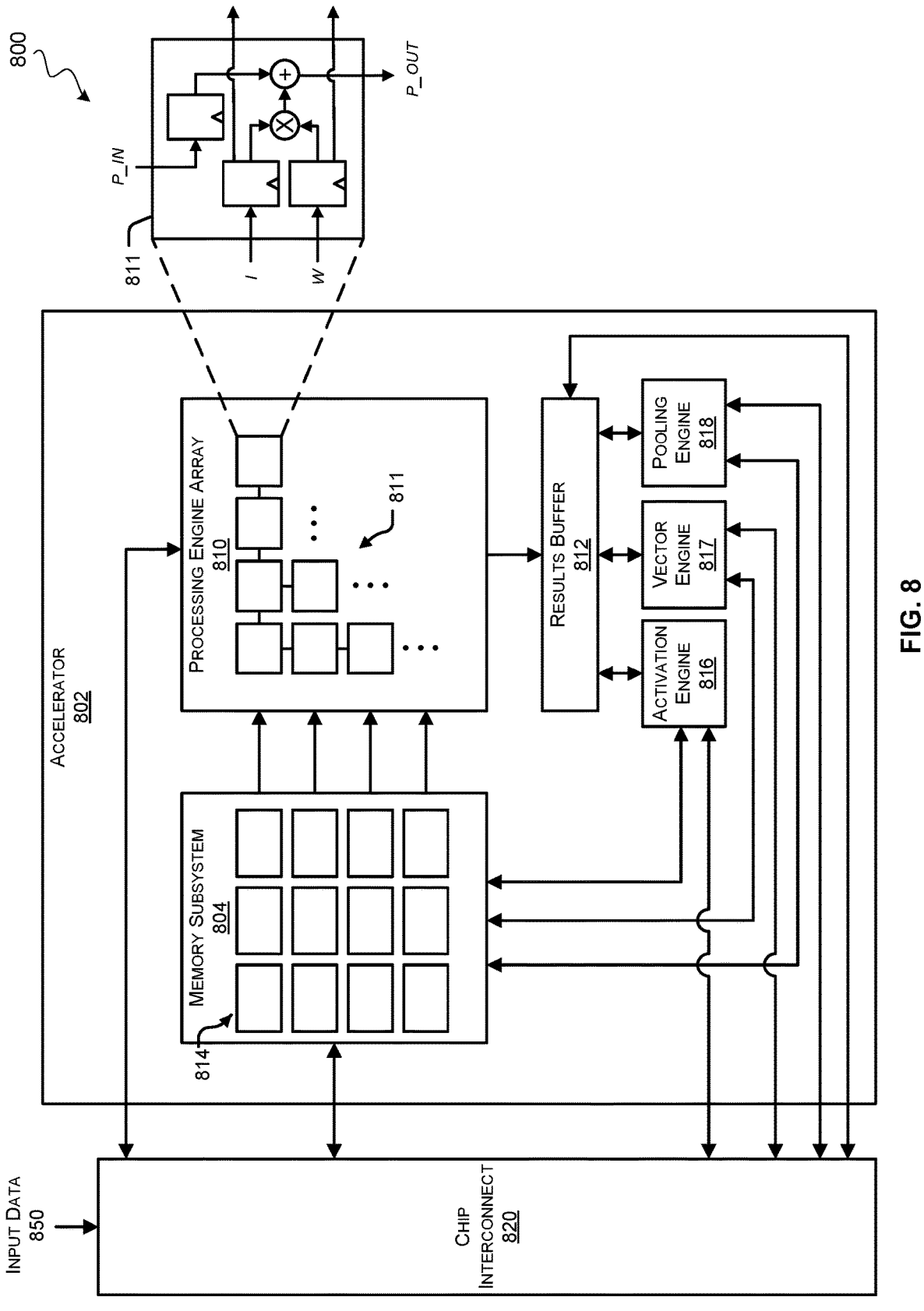
FIG. 8 illustrates a block diagram of an example of an integrated circuit device.

FIG. 8 is a block diagram illustrating an example of an IC device 800. The example of FIG. 8 illustrates an accelerator 802 that can be an example implementation of the IC device 104 in FIG. 1. In various examples, the accelerator 802, for a set of input data (e.g., input data 850), can execute computations using a processing engine array 810, an activation engine 816, a vector engine 817, and/or a pooling engine 818. In some examples, the example accelerator 802 may be an integrated circuit component of a processor, such as a neural network processor. The processor may have other integrated circuit components, including additional accelerator engines.

In various implementations, the memory subsystem 804 can include multiple memory banks 814. Memory subsystem 804 can also be referred to as a state buffer. In these implementations, each memory bank 814 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 814. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 804 can permit simultaneous access to the read or write channels of multiple memory banks. As another example, the memory subsystem 804 can include arbitration logic such that arbitration between, for example, the outputs of multiple memory banks 814 can result in more than one memory bank's output being used. In these and other examples, though globally managed by the memory subsystem 804, each memory bank can be operated independently of any other.

Having the memory banks 814 be independently accessible can increase the efficiency of the accelerator 802. For example, values can be simultaneously read and provided to each row of the processing engine array 810, so that the entire processing engine array 810 can be in use in one clock cycle. As another example, the memory banks 814 can be read at the same time that results computed by the processing engine array 810 are written to the memory subsystem 804. In contrast, a single memory may be able to service only one read or write at a time. With a single memory, multiple clock cycles can be required, for example, to read input data for each row of the processing engine array 810 before the processing engine array 810 can be started.

In various implementations, the memory subsystem 804 can be configured to simultaneously service multiple clients, including the processing engine array 810, the activation engine 816, the vector engine 817, the pooling engine 818, and any external clients that access the memory subsystem 804 over a communication fabric 820. In some implementations, being able to service multiple clients can mean that the memory subsystem 804 has at least as many memory banks as there are clients. In some cases, each row of the processing engine array 810 can count as a separate client. In some cases, each column of the processing engine array 810 can output a result, such that each column can count as a separate write client. In some cases, output from the processing engine array 810 can be written into the memory banks 814 that can then subsequently provide input data for the processing engine array 810. As another example, the activation engine 816, the vector engine 817, and the pooling engine 818 can include multiple execution channels, each of which can be separate memory clients. The memory banks 814 can be implemented, for example, using static random access memory (SRAM).

In various implementations, the memory subsystem 804 can include control logic. The control logic can, for example, keep track of the address spaces of each of the memory banks 814, identify memory banks 814 to read from or write to, and/or move data between the memory banks 814. In some implementations, memory banks 814 can be hardwired to particular clients. For example, a set of memory banks 814 can be hardwired to provide values to the rows of the processing engine array 810, with one memory bank servicing each row. As another example, a set of memory banks can be hard wired to receive values from columns of the processing engine array 810, with one memory bank receiving data for each column.

The processing engine array 810 is the computation matrix of the example accelerator 802. The processing engine array 810 can, for example, execute parallel integration, convolution, correlation, and/or matrix multiplication, among other things. The processing engine array 810 includes multiple processing engines 811, arranged in rows and columns, such that results output by one processing engine 811 can be input directly into another processing engine 811. Processing engines 811 that are not on the outside edges of the processing engine array 810 thus can receive data to operate on from other processing engines 811, rather than from the memory subsystem 804.

In various examples, the processing engine array 810 uses systolic execution, in which data arrives at each processing engine 811 from different directions at regular intervals. In some examples, input data can flow into the processing engine array 810 from the left and weight values can be loaded at the top. In some examples weights and input data can flow from the left and partial sums can flow from top to bottom. In these and other examples, a multiply-and-accumulate operation moves through the processing engine array 810 as a diagonal wave front, with data moving to the right and down across the array. Control signals can be input at the left at the same time as weights, and can flow across and down along with the computation.

In various implementations, the number of columns in the processing engine array 810 determines the computational capacity of the processing engine array 810, and the number of rows determines the required memory bandwidth for achieving maximum utilization of the processing engine array 810. The processing engine array 810 can have, for example, 64 columns and 128 rows, or some other number of columns and/or rows.

An example of a processing engine 811 is illustrated in FIG. 8 in an inset diagram. As illustrated by this example, a processing engine 811 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 811.

In the illustrated example, an input from above can include a partial sum, p_in, provided either from another processing engine 811 or from a previous round of computation by the processing engine array 810. When starting a computation for a new set of input data, the top row of the processing engine array 810 can receive a fixed value for p_in, such as zero. As illustrated by this example, i and w are multiplied together and the result is summed with p_in to produce a new partial sum, p_out, which can be input into another processing engine 811. Various other implementations of the processing engine 811 are possible.

Outputs from the last row in the processing engine array 810 can be temporarily stored in the results buffer 812. The results can be intermediate results, which can be written to the memory banks 814 to be provided to the processing engine array 810 for additional computation. Alternatively, the results can be final results, which, once written to the memory banks 814 can be read from the memory subsystem 804 over the communication fabric 820, to be output by the system.

In some implementations, the accelerator 802 includes an activation engine 816. In these implementations, the activation engine 816 can combine the results from the processing engine array 810 into one or more output activations. For example, for a convolutional neural network, convolutions from multiple channels can be summed to produce an output activation for a single channel. In other examples, accumulating results from one or more columns in the processing engine array 810 may be needed to produce an output activation for a single node in the neural network. In some examples, activation engine 816 can be bypassed.

In various examples, the activation engine 816 can include multiple separate execution channels. In these examples, the execution channels can correspond to the columns of the processing engine array 810, and can perform an operation on the outputs of a column, the result of which can be stored in the memory subsystem 804. In these examples, the activation engine 816 may be able to perform between 1 and n parallel computations, where n is equal to the number of columns in the processing engine array 810. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 802 can include a pooling engine 818. Pooling is the combining of outputs of the columns of the processing engine array 810. Combining can include for example, computing a maximum value, a minimum value, an average value, a median value, a summation, a multiplication, or another logical or mathematical combination. In various examples, the pooling engine 818 can include multiple execution channels that can operating on values from corresponding columns of the processing engine array 810. In these examples, the pooling engine 818 may be able to perform between 1 and n parallel computations, where n is equal to the number of columns in the processing engine array 810. In various examples, execution channels of the pooling engine 818 can operate in parallel and/or simultaneously. In some examples, the pooling engine 818 can be bypassed.

In some implementations, the accelerator 802 can further include a vector engine 817. Vector engine 817 is a compute engine that can perform computations and manipulations on values stored in memory subsystem 804 and/or results buffer 812 such as values representing matrices of input values, weight values, intermediate results, etc. Vector engine 817 can include multiple execution channels each with a pipeline of computation circuit blocks (e.g., arithmetic logic units) to perform complex computations such as nested multiply-and-add operations and/or complex manipulations such as sorting operations. In various examples, execution channels of the vector engine 817 can operate in parallel and/or simultaneously. In some examples, the vector engine 817 can be bypassed or be omitted.

Herein, the activation engine 816, the vector engine 817, and the pooling engine 818 may be referred to collectively as execution engines. The processing engine array 810 is another example of an execution engine. Another example of an execution engine is a Direct Memory Access (DMA) engine, which may be located outside the accelerator 802.

Input data 850 can arrive over the communication fabric 820. The communication fabric 820 can connect the accelerator 802 to other components of a processor, such as a DMA engine that can obtain input data 850 from an Input/Output (I/O) device, a storage drive, or a network interface. The input data 850 can be, for example one-dimensional data, such as a character string or numerical sequence, or two-dimensional data, such as an array of pixel values for an image or frequency and amplitude values over time for an audio signal. In some examples, the input data 850 can be three-dimensional, as may be the case with, for example, the situational information used by a self-driving car or virtual reality data. In some implementations, the memory subsystem 804 can include a separate buffer for the input data 850. In some implementations, the input data 850 can be stored in the memory banks 814 when the accelerator 802 receives the input data 850.

In some examples, the accelerator 802 can implement a neural network processing engine. In these examples, the accelerator 802, for a set of input data 850, can execute a neural network to perform a task for which the neural network was trained. Executing a neural network on a set of input data can be referred to as inference or performing inference.

The weights for the neural network can be stored in the memory subsystem 804, along with input data 850 on which the neural network will operate. The neural network can also include instructions, which can program the processing engine array 810 to perform various computations on the weights and the input data. The instructions can also be stored in the memory subsystem 804, in the memory banks 814 or in a separate instruction buffer. The processing engine array 810 can output intermediate results, which represent the outputs of individual layers of the neural network. In some cases, the activation engine 816, the vector engine 817, and/or pooling engine 818 may be enabled for computations called for by certain layers of the neural network. The accelerator 802 can store the intermediate results in the memory subsystem 804 for inputting into the processing engine array 810 to compute results for the next layer of the neural network. The processing engine array 810 can further output final results from a last layer of the neural network. The final results can be stored in the memory subsystem 804 and then be copied out to host processor memory or to another location.

Figure 9:
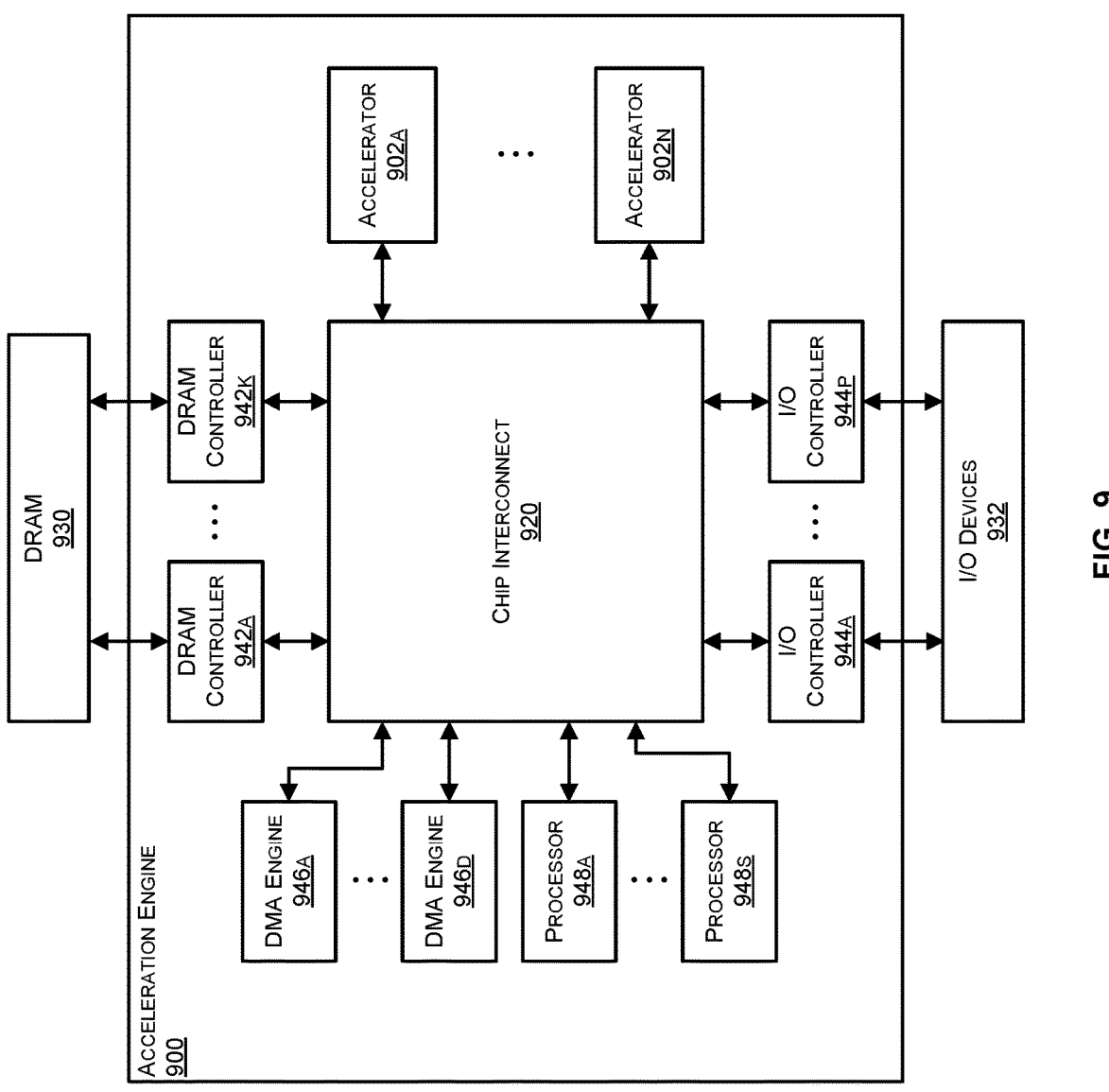
FIG. 9 illustrates a block diagram of an example of an acceleration engine.

FIG. 9 includes a block diagram that illustrates an example of an acceleration engine 900. The acceleration engine 900 is an example of an integrated circuit that can include one or more accelerators 902a-902n that may be similar to the accelerator illustrated in FIG. 8.

In the example of FIG. 9, the acceleration engine 900 includes multiple accelerators 902a-902n, each of which can perform a set of operations. In various examples, the accelerators 902a-902n are for particular types of operations, so that the accelerators 902a-902n can perform the operations much faster than when similar operations are performed by a general-purpose processor. In various examples, to perform a set of operations, input data on which the operations are to be performed must first be moved into the accelerators 902a-902n. Additionally, in some cases, program code is also moved into the accelerators 902a-902n, which programs the operations that the accelerators 902a-902n will perform on the data. In the illustrated example, the acceleration engine 900 includes n accelerators 902a-902n. Examples of accelerators that can be included in the acceleration engine 900 include graphics accelerators, floating point accelerators, neural network accelerators, and others. In various examples, the accelerators 902a-902n can each be the same (e.g., each of the is a graphics accelerator) or can be different (e.g., the accelerators 902a-902n include a graphics accelerator, a floating point accelerator, and neural network accelerator).

The example acceleration engine 900 further includes DRAM controllers 942a-942k for communicating with an external memory. The external memory is implemented, in this example, using DRAM 930. In the illustrated example, the acceleration engine 900 includes k DRAM controllers 942a-942k, each of which may be able to communicate with an independent set of banks of DRAM. In other examples, other types of RAM technology can be used for the external memory. The DRAM controllers 942a-942k can also be referred to as memory controllers.

In various examples, input data and/or program code for the accelerators 902a-902n can be stored in the DRAM 930. Different programs can cause the accelerators 902a-902n to perform different operations. For example, when one of the accelerators is a neural network accelerator, one program can configure the neural network accelerator to perform speech recognition while another program can configure the neural network accelerator to perform image recognition. In various examples, different accelerators 902a-902n can be programmed with different programs, so that each performs a different set of operations. In various examples, the processors 948a-948s can manage moving of program code from the DRAM 930 to the accelerators 902a-902n.

The example acceleration engine 900 further includes I/O controllers 944a-944p for communicating with I/O devices 932 in the system. The acceleration engine 900 can communicate with I/O devices over, for example, a processor bus. In some examples, the processor bus can be implemented using Peripheral Component Interconnect (PCI) and/or a variation of the PCI bus protocol. The processor bus can connect the acceleration engine 900 to I/O devices such as, for example, input and output devices, memory controllers, storage devices, and/or network interface cards, among other things. In some examples, the I/O controllers 944-944p can enable the acceleration engine 900 to act as an I/O device for a host processor. For example, the acceleration engine 900 can be the recipient of input data from the host processor, and a command indicating an operation to be performed on the input data (e.g., a particular computation or analysis). In the illustrated example, the acceleration engine 900 includes p I/O controllers 944a-944p, each of which may include a separate root complex and may communicate with a separate set of I/O devices 932. In other examples, other standardized bus protocols, such as Ultra Path Interconnect (UPI) can be used for the host bus. In other examples, a proprietary bus protocol can be used.

Movement of data in the acceleration engine 900 can be managed by one or more processors 948a-948s, which can also be referred to as data management processors. In the example of FIG. 9, the acceleration engine 900 includes s processors 948a-948s incorporated into the device (e.g., on the same silicon die). In other examples, the processors 948a-948s can be external to the acceleration engine 900 (e.g., on a different die and/or in a different package). In some examples, the processors 948a-948s can manage the movement of data from I/O devices 932 to the accelerators 902a-902n or the DRAM 930. For example, input data may be located at an I/O device 932 or in processor memory, and the processors 948a-948s can move the input from the I/O device 932 or processor memory into an accelerator or into DRAM 930. As another example, program code for the accelerators 902a-902n may be located on an I/O device 932 or in processor memory.

The example acceleration engine 900 further includes DMA engines 946a-946d (e.g., each can be DMA engine 600) that can move data between the accelerators 902a-902n, DRAM controllers 942a-942k, and I/O controllers 944a-944p. In the illustrated example, the acceleration engine 900 includes d DMA engines 946a-946d. In some implementations, the DMA engines 946a-946d can be assigned to specific tasks, such as moving data from the DRAM controllers 942a-942d to the accelerators 902a-902n, or moving data between the I/O controllers 944a-944p and the accelerators 902a-902n. These tasks can be assigned, for example, by enqueueing descriptors with the DMA engines 946a-946d, where a descriptor identifies an address for a block of data and an operation (e.g., a read or a write) to perform. A descriptor, for example, can direct a DMA engine to instruct a DMA controller to read a block of data from DRAM 930. A descriptor can, as a further example, instruct the DMA engine to write data, read by the DMA controller, to an accelerator. Further descriptors can be used to move data from an accelerator to DRAM 930.

In various examples, each of the processors 948a-948s can be responsible for managing the data movement for a different accelerator. In some examples, a processor may manage the data movement for more than one accelerator. Similarly, in various examples, each of the processors 948a-

948s can be assigned to one or more DMA engines 946a-946d. In these and other examples, associations between processors 948a-948s, accelerators 902a-902n, and DMA engines 946a-946d are determined by program code being executed by each respective processor.

In the example acceleration engine 900, the various components can communicate over a chip interconnect 920. The chip interconnect 920 primarily includes wiring for routing data between the components of the acceleration engine 900. In some cases, the chip interconnect 920 can include a minimal amount of logic, such as multiplexors to control the direction of data, flip-flops for handling clock domain crossings, and timing logic.

Figure 10:
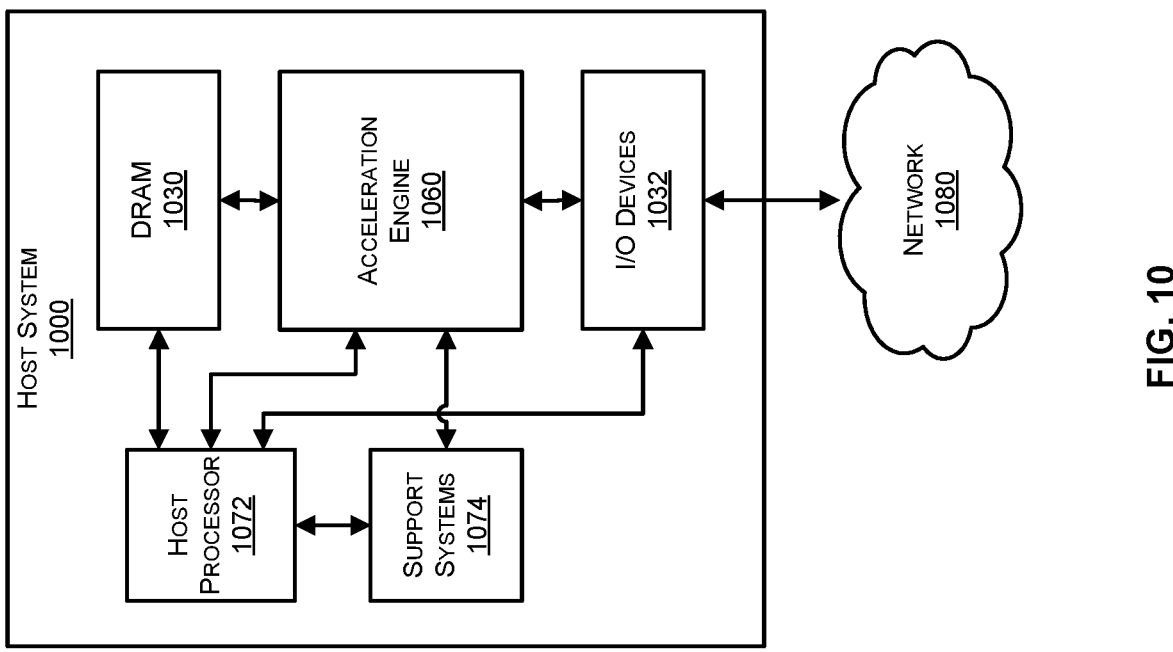
FIG. 10 illustrates a block diagram of an example of a host system.

FIG. 10 includes a block diagram that illustrates an example of a host system 1000 in which an acceleration engine 1060 can be used. The acceleration engine 1060 of FIG. 10 is an example of a device that can include one or more accelerators such as is illustrated in FIG. 9. The example host system 1000 of FIG. 10 includes the acceleration engine 1060, a host processor 1072, DRAM 1030 or processor memory, I/O devices 1032, and support systems 1074. In various implementations, the host system 1000 can include other hardware that is not illustrated here.

The host processor 1072 is a general-purpose integrated circuit that is capable of executing program instructions. In some examples, the host processor 1072 can include multiple processing cores. A multi-core processor may include multiple processing units within the same processor. In some examples, the host system 1000 can include more than one host processor 1072. In some examples, the host processor 1072 and the acceleration engine 1060 can be one chip, such as, one or more integrated circuits within the same package.

In various examples, the host processor 1072 can communicate with other components in the host system 1000 over one or more communication channels. For example, the host system 1000 can include a host processor bus, which the host processor 1072 can use to communicate with the DRAM 1030, for example. As another example, the host system 1000 can include an I/O bus, such as a PCI-based bus, over which the host processor 1072 can communicate with the acceleration engine 1060 and/or the I/O devices 1032, for example. In various examples, the host system 1000 can, alternatively or additionally, include other communication channels or busses, such as serial busses, power management busses, storage device busses, and so on.

In some examples, software programs executing on the host processor 1072 can receive or generate input for processing by the acceleration engine 1060. In some examples, the programs can select an appropriate neural network to execute for a given input. For example, a program may be for language translation, and can select one or more neural networks capable of speech recognition and/or machine translation. In these and other examples, the programs can configure the acceleration engine 1060 with the neural network to execute, and/or can select a neural network processing engine on the acceleration engine 1060 that has previously been configured to execute the desired neural network. In some examples, once the acceleration engine 1060 has started an inference on input data, the host processor 1072 can manage the movement of data (such as weights, instructions, intermediate results, results of conditional layers, and/or final results) into or out of the acceleration engine 1060.

In some examples, a software program that is using the acceleration engine 1060 to conduct an inference can read the result from a conditional layer from the acceleration engine 1060 and/or from a storage location, such as in DRAM 1030. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1030 is memory that is used by the host processor 1072 for storage of program code that the host processor 1072 is in the process of executing, as well as values that are being operated on. In some examples, the data for a neural network (e.g., weight values, instructions, and other data) can be all or partially stored in the DRAM 1030. DRAM is a common term for processor memory, and though DRAM is volatile memory, processor memory can be volatile and/or non-volatile. Though not illustrated here, the host system 1000 can include other volatile and non-volatile memories for other purposes. For example, the host system 1000 can include a Read-Only Memory (ROM) that stores boot code for booting the host system 1000 at power on, and/or Basic Input/Output System (BIOS) code.

Though not illustrated here, the DRAM 1030 can store instructions for various programs, which can be loaded into and be executed by the host processor 1072. For example, the DRAM 1030 can be storing instructions for an operating system, one or more data stores, one or more application programs, one or more drivers, and/or services for implementing the features disclosed herein.

The operating system can manage and orchestrate the overall operation of the host system 1000, such as scheduling tasks, executing applications, and/or controller peripheral devices, among other operations. In some examples, a host system 1000 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1000. For example, some drivers can provide communication between the operating system and peripheral devices or I/O devices 1032. Alternatively or additionally, some drivers may provide communication between application programs and the operating system, and/or application programs and peripheral devices accessible to the host system 1000. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1032 can include hardware for connecting to user input and output devices, such as keyboards, mice, pens, tablets, voice input devices, touch input devices, displays or monitors, speakers, and printers, among other devices. The I/O devices 1032 can also include storage drives and/or network interfaces for connecting to a network 1080. For example, the host system 1000 can use a network interface to communicate with storage devices, user terminals, other computing devices or servers, and/or other networks, among various examples.

In various examples, one or more of the I/O devices 1032 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1000 or may be in an external enclosure. A storage device can be fixed (e.g., attached by screws) or removable (e.g., having a physical release mechanism and possibly a hot-plug mechanism).

Storage devices, the DRAM 1030, and any other memory component in the host system 1000 are examples of computer-readable storage media. Computer-readable storage media are physical mediums that are capable of storing data in a format that can be read by a device such as the host processor 1072. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1032 can be PCI-based devices. In these examples, a PCI-based I/O device includes a PCI interface for communicating with the host system 1000. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1074 can include hardware for coordinating the operations of the acceleration engine 1060. For example, the support systems 1074 can include a microprocessor that coordinates the activities of the acceleration engine 1060, including moving data around on the acceleration engine 1060. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1072. In some examples, the program executed by the microprocessor is stored on the hardware of microprocessor, or on a non-volatile memory chip in the host system 1000. In some examples, the microprocessor and the acceleration engine 1060 can be on chip, such as one integrated circuit on the same die and in the same package.

In some examples, the support systems 1074 can be responsible for taking instructions from the host processor 1072 when programs executing on the host processor 1072 request the execution of a neural network. For example, the host processor 1072 can provide the support systems 1074 with a set of input data and a task that is to be performed on the set of input data. In this example, the support systems 1074 can identify a neural network that can perform the task, and can program the acceleration engine 1060 to execute the neural network on the set of input data. In some examples, the support systems 1074 only needs to select an appropriate neural network processing engine of the neural network processor. In some examples, the support systems 1074 may need to load the data for the neural network onto the acceleration engine 1060 before the acceleration engine 1060 can start executing the neural network. In these and other examples, the support systems 1074 can further receive the output of executing the neural network, and provide the output back to the host processor 1072.

In some examples, the operations of the support systems 1074 can be handled by the host processor 1072. In these examples, the support systems 1074 may not be needed and can be omitted from the host system 1000.

In various examples, the host system 1000 can include a combination of host systems, processor nodes, storage subsystems, and I/O chassis that represent user devices, service provider computers or third-party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1000 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A direct memory access (DMA) engine of a neural network accelerator, comprising:
   a read descriptor queue configured to store read memory descriptors for a DMA read operation, the read descriptor queue having a read descriptor tail pointer and a read data tail pointer;
   a write descriptor queue configured to store write memory descriptors for a DMA write operation, the write descriptor queue having a write descriptor tail pointer and a write data tail pointer;
   a read data buffer configured to store data being read with the read memory descriptors;
   a write data buffer configured to store data being written with the write memory descriptors; and
   a DMA controller configured to:
      determine that the read memory descriptors for a DMA read operation are stored in a memory based on an update of the read descriptor tail pointer to point to a location in the read descriptor queue;
      prefetch the read memory descriptors from the memory into the read descriptor queue to fill the location without waiting for data to be read for the DMA read operation to be ready at memory locations specified in the read memory descriptors;
      determine that the data to be read at the memory locations specified in the read memory descriptors for the DMA read operation is ready based on an update of the read data tail pointer to point to the location in the read descriptor queue; and
      perform the DMA read operation by reading the data from the memory locations specified in the read memory descriptors into the read data buffer in response to both the read descriptor tail pointer and the read data tail pointer having been updated to the location in the read descriptor queue.

2. The DMA engine of claim 1, wherein the data to be read is being written to the memory locations while the read memory descriptors are being prefetched from the memory.

3. The DMA engine of claim 1, wherein the DMA controller is further configured to:
   determine that the write memory descriptors for a DMA write operation are stored in the memory based on an update of the write descriptor tail pointer to the write descriptor queue;
   prefetch the write memory descriptors from the memory into the write descriptor queue without waiting for memory locations specified in the write memory descriptors to be available to store data for the DMA write operation;
   determine that the memory locations specified in the write memory descriptors are available to store the data for the DMA write operation based on an update of the write data tail pointer to the write descriptor queue; and
   perform the DMA write operation by writing the data from the write data buffer into the memory locations specified in the write memory descriptors in response to both the write descriptor tail pointer and the write data tail pointer being updated.

4. The DMA engine of claim 3, wherein the memory locations specified in the write memory descriptors become available to store the data for the DMA write operation when previously stored data at the memory locations are no longer needed.

5. A method performed by a direct memory access (DMA) engine, comprising:

receiving a first indication that memory descriptors for a DMA operation are ready to be fetched from a memory based on a semaphore update;

prefetching the memory descriptors from the memory without waiting for memory locations specified in the memory descriptors to be ready for access by the DMA operation;

receiving a second indication that the memory locations specified in the memory descriptors are ready to be accessed; and upon receiving the second indication, executing the DMA operation to access the memory locations specified in the memory descriptors.

6. The method of claim 5, wherein the DMA operation is a DMA read operation to read data, and the memory locations specified in the memory descriptors are ready to be accessed when the data to be read has been stored in the memory locations.

7. The method of claim 6, wherein the first indication includes updating of a descriptor tail pointer to a read descriptor queue configured to store the memory descriptors for the DMA read operation.

8. The method of claim 7, wherein the second indication includes updating of a data tail pointer to the read descriptor queue, and the DMA read operation is executed when both the descriptor tail pointer and the data tail pointer to the read descriptor queue have been updated.

9. The method of claim 6, wherein the data to be read is being written to the memory locations while the memory descriptors are being prefetched from the memory.

10. The method of claim 5, wherein the DMA operation is a DMA write operation, and the memory locations specified in the memory descriptors are ready to be accessed when previously stored data at the memory locations are no longer needed.

11. The method of claim 10, wherein the first indication includes updating of a descriptor tail pointer to a write descriptor queue configured to store the memory descriptors for the DMA write operation.

12. The method of claim 11, wherein the second indication includes updating of a data tail pointer to the write descriptor queue, and the DMA write operation is executed when both the descriptor tail pointer and the data tail pointer to the write descriptor queue have been updated.

13. The method of claim 10, wherein the previously stored data at the memory locations are being read by a consumer of the previously stored data while the memory descriptors are being prefetched from the memory.

14. A direct memory access (DMA) engine, comprising:

one or more descriptor queues configured to store memory descriptors for DMA operations; and a DMA controller configured to:

receive a first indication that memory descriptors for a DMA operation are ready to be fetched from a memory;

prefetch the memory descriptors from the memory without waiting for memory locations specified in the memory descriptors to be ready for access by the DMA operation;

receive a second indication that the memory locations specified in the memory descriptors are ready to be accessed; and upon receiving the second indication, execute the DMA operation to access the memory locations specified in the memory descriptors.

15. The DMA engine of claim 14, wherein the DMA operation is a DMA read operation to read data, and the memory locations specified in the memory descriptors are ready to be accessed when the data to be read has been stored in the memory locations.

16. The DMA engine of claim 15, wherein the first indication includes updating of a descriptor tail pointer to a descriptor queue from the one or more descriptor queues configured to store the memory descriptors for the DMA read operation.

17. The DMA engine of claim 16, wherein the second indication includes updating of a data tail pointer to the descriptor queue, and the DMA read operation is executed when both the descriptor tail pointer and the data tail pointer to the descriptor queue have been updated.

18. The DMA engine of claim 15, wherein the data to be read is being written to the memory locations while the memory descriptors are being prefetched from the memory.

19. The DMA engine of claim 14, wherein the DMA operation is a DMA write operation, and the first indication includes updating of a descriptor tail pointer to a descriptor queue from the one or more descriptor queues configured to store the memory descriptors for the DMA write operation.

20. The DMA engine of claim 19, wherein the second indication includes updating of a data tail pointer to the descriptor queue, and the DMA write operation is executed when both the descriptor tail pointer and the data tail pointer to the descriptor queue have been updated.

\* \* \* \* \*